Figure 1:
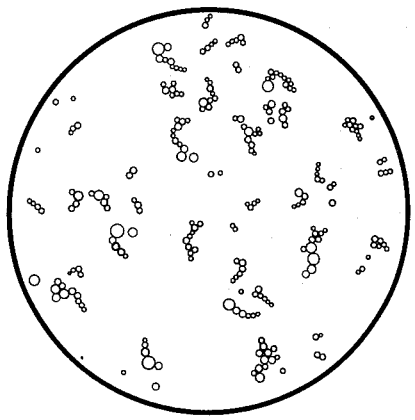

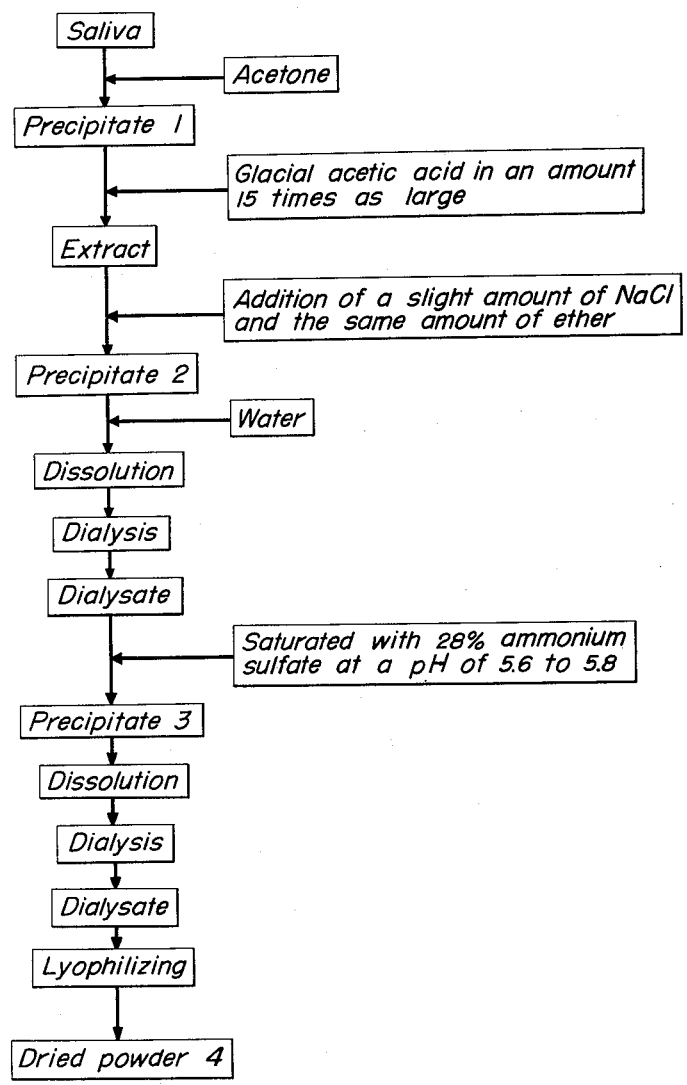

METHOD OF PRODUCING A SUBSTANCE HAVING NEW STRONG PHYSIOLOGICAL ACTIONS FROM HUMAN OR CATTLE SALIVA

Yosoji Ito and Sashichi Okabe, both of Tokyo, Japan, assignors to Teikoku Hormone Manufacturing Co., Ltd., Tokyo, Japan, a corporation of Japan
Filed Aug. 8, 1961, Ser. No. 130,054
Claims priority, application Japan, Apr. 2, 1957, 32/8,105
10 Claims. (Cl. 167—74)

This invention relates to the production of new substances having strong physiological actions. More particularly, it relates to methods of extracting and purifying a new substance having physiological action such as reducing serum calcium level, increasing the number of circulating leucocytes and promoting the growth of hard tissue by the use of human or cattle saliva. This application is a continuation-in-part application of our earlier filed applications Serial No. 671,667 and Serial No. 834,546, now abandoned, filed respectively July 12, 1957, and August 18, 1959.

A substance called parotin and having physiological actions has heretofore been separated from human and cattle saliva. However, its activity per unit weight is very small. According to conventional method of production, saliva is made alkaline at a pH of 9.6 to 10.0, is thereafter cooled and is then made weakly acidic at about pH 5.4 alternatively an organic solvent which is miscible with water such as alcohol or acetone alone or, in some case, together with ether is added to the above mentioned acidic saliva to precipitate the active principle. This precipitate is then extracted with slightly alkaline water of a pH of about 8.0 and is then purified by repeating said precipitating and extracting operations. Alternatively a precipitate is deposited by saturating said alkaline solution with table salt or ammonium sulfate and the precipitate is then dialyzed. A substance which is isoelectrically precipitated at a pH 5.4 to 6.2 from the dialysate is again extracted with water of a pH of 8.0 and the active principle is purified by repeating the isoelectric precipitation and extraction.

The present invention provides a substance having new strong physiological activities and which is different from the active ingredient in saliva. This new active substance is called saliva-parotin-A and is remarkably effective as a therapeutic drug of chronic marginal periodontitis (periodontosis).

It is an object of the present invention to provide an effective method of extracting and purifying saliva-parotin-A.

The general physical and chemical characteristics and biological actions of saliva-parotin-A are as shown in the following table. In comparing its biological actions with those of parotin, it is found that the activity of saliva-parotin-A per unit weight is very great. The physical and chemical characteristics of saliva-parotin-A are considerably different from those of parotin. It is seen from the results of measurement by means of polarograms or ultracentrifugation that saliva-parotin-A is a substance of a molecular weight far lower than that of parotin.

COMPARISON OF THE CHARACTERISTICS OF PAROTIN WITH THOSE OF SALIVA-PAROTIN-A

| | Parotin | Saliva-parotin-A |
|---|---|---|
| Isoelectric point | pH 5.7 | pH 5.4 to 5.6 It does not precipitate at the isoelectric point. |
| Electrophoresis | Homogeneous. (pH 8.0 phosphate buffer solution.) | Almost homogeneous. (pH 8.6 veronal buffer solution.) It migrates extremely slowly in phosphate, borate and acetate buffer solutions. |
| Values of analysis of elements | C: 50.84%; H: 7.31%; N: 14.53%; S: 0.77%; Ash: nil. | C: 46.62%; H: 6.99%; N: 15.21%; S: nil; Ash: nil. |
| Polarograms | Second wave $-1.35$ volts ($CO^{++}$), $-1.35$ volts ($CO^{+++}$). Third wave $-1.57$ volts ($CO^{++}$), $-1.60$ volts ($CO^{+++}$). | Neither $CO^{++}$ nor $CO^{+++}$ produces reduction. |
| The wave length of maximum absorption | $277 \pm 0.5$ m$\mu$ | $277.5 \pm 0.5$ m$\mu$. |
| Ultracentrifugation | $S_{20w} = 4.40 \times 10^{-13}$ (Phosphate buffer solution) | $S_{20w} = 1.01 \times 10^{-13}$ (Phosphate buffer solution). |
| Constituent amino acids | Glycine, alanine, valine, leucine, phenyl alanine, aspartic acid, glutamic acid, arginine, lysine, histidine, cystine, methionine, serine, threonine, proline, tryptophan and tyrosine, totalling 17. | Glycine, alanine, valine, leucine, aspartic acid, glutamic acid, arginine, serine, proline, lysine, tryptophan, histidine and tyrosin phenylalanine. (It contains no sulfur-containing amino acid.) |
| Stability against heat | Unstable. It is inactivated in a boiling water bath within 30 minutes. | Stable. It is inactivated slightly in a boiling water bath within 30 minutes. |
| Stability against acid and alkali | It is almost inactivated with 0.1 N HCl (pH 1.08) and is slightly with 0.1 M $Na_2CO_3$. | Stable with 0.1 N HCl. Under treatment with 0.1 M $Na_2CO_3$ the activity of reducing the calcium level is not altered, but the activity of increasing the number of circulating leucocytes is lost. |
| Denaturation | It is denatured by urea and $NaNO_2$ and the activity of reducing the calcium level is lost. | Neither of the activities of reducing the serum calcium level and of increasing the number of circulating leucocytes is changed. |
| Activity of reducing the rabbit serum calcium level. | The minimum amount of reducing the serum calcium level to 15% is 1.0 to 1.5 mg./kg. by intravenous injection. | 0.05 to 0.1 mg./kg. by intravenous injection. |
| Activity of increasing the number of circulating leucocytes. | Increases 2 to 3 times with 1 to 5 mg./kg. dose by intravenous injection. | 0.005 to 0.01 mg./kg. by intravenous injection. |
| The activity of accelerating the calcification of rabbit incisor dentine. | The minimum effective dose to show the activity of accelerating the calcification of incisor dentine is 1.0 mg./kg. by intravenous injection. | 0.05 mg./kg. by intravenous injection. |

It is found from the above table that both substances have almost the same physiological actions but are entirely different from each other due to the fact that saliva-parotin-A has no sulfur-containing amino acid as a constituent molecule as well as other characteristics and in addition to the fact that saliva-parotin-A has physiological activities stronger than those of parotin.

FIGURE 1 of the accompanying drawings is a microphotograph ($\times 1000$) of the new substance obtained by the method of the present invention and deposited from a ⅔ saturated solution of ammonium sulfate.

FIGURE 2 is a system diagram of the method of the present invention.

In the method according to the present invention, a dried precipitate obtained by treating human and general cattle animal saliva with an organic solvent is used as a starting material. That is to say, in the evening of the day when the saliva (pH 6.8 to 7.2) is collected, acetone is introduced into the saliva while stirring to make the concentration of acetone 70 to 80%. When the concentration of acetone is less than 70%, the precipitation of the effective ingredient will be incomplete. The longer the time after the collection of saliva, the smaller the amount of precipitation by acetone. When a large amount of acetone is added at one time without stirring, the precipitation will be incomplete. After a solution of a concentration of 70 to 80% of acetone has been left overnight to precipitate completely, the precipitate 1 (FIG. 2) is obtained by removing the clear supernatant by means of a siphon. Said precipitate is centrifuged, is washed with pure acetone or ether and is dried under vacuum in an exsiccator over phosphorous pentoxide. The fresher the saliva, the larger the yield of this acetone precipitate 1 and the higher the effect per unit weight. The yield of this acetone precipitate is on an average 200 mg./100 cc. of saliva depending on individuals.

The effective ingredient or saliva-parotin-A can be extracted at a favorable yield from the precipitate 1 by using glacial acetic acid or a mixed solution of glacial acetic acid and methanol. The completely dried powder of the precipitate 1 is treated with 15 times its weight of glacial acetic acid while stirring at 60 to 70° C. for 2 hours. When this treatment is repeated 2 to 3 times, almost all of the effective ingredient is extracted. That is to say, about 73% of the effective ingredient is extracted in the first extraction, about 20% in the second and about 7% in the third. In animal tests, the residue contained little active saliva-parotin-A. The presence of water in this extracting process is likely to elute impure protein and hydrolyze the effective ingredient and is not preferable. The effective ingredient may be extracted at room temperature. However, there are so many various germs in saliva that it is preferable to heat the saliva with a view toward sterilizing it completely.

The three extracts are combined and the mixture is filtered. From one-tenth to one-fifth of a saturated aqueous table salt solution is added per 100 cc. of the transparent filtrate. Ether in the same amount as that of the filtrate is added thereto gradually while shaking. The solution is left in a refrigerator overnight to complete the deposition of a precipitate. The precipitate 2 is obtained by filtration with a glass filter or by centrifugation. The precipitate is washed with acetone and/or ether, the acetic acid is removed and it is dried under vacuum. The yield of the precipitate 2 will be about 15% of that of the precipitate 1.

The precipitate 2 is dissolved in an NaOH solution in a ratio of about 1 part in 80 to make the pH 10.0 to 11.0. The undissolved residue is centrifuged. The clean supernatant is adjusted with N-HCl so that the pH is about 7.0 and is dialyzed for 5 to 6 days with about 2 liters of distilled water replaced every day and at a low temperature of around 5° C. by using a cellophane bag. When the solution is left in strong alkalinity for more than 5 hours, the activity is reduced. Therefore, the solution within the bag in this dialysis should be neutralized as early as possible. When the pH of the solution within the bag in the dialysis becomes equal to that of the solution outside the bag, that is, to 5.6 to 5.8 (methyl red), the impurities are precipitated. The precipitate is filtered. The filtrate is then lyophilized (the yield being 70 to 75% of the precipitate 2) and is then dissolved in distilled water. Alternatively, without being dried, the filtrate is diluted (as it is) with distilled water so as to be of a concentration of about 1%. When a saturated ammonium sulfate solution is introduced at a pH of 5.6 to 5.8 into such solution while stirring and cooling with ice a precipitate 3 will begin to be deposited at a concentration of about 15% of ammonium sulfate. The ammonium sulfate solution is added until a concentration of 28% of ammonium sulfate is reached. When the solution is left in a refrigerator overnight, the active ingredient is precipitated in the form of brownish yellow granules.

The precipitate 3 is separated by centrifugation, is dissolved in a small amount of water and is dialyzed for 5 to 6 days with about 2 liters of distilled water replaced every day and by using a cellophane bag to remove the ammonium sulfate completely. The precipitate thus obtained in a slight amount is removed by filtration. The filtrate is lyophilized. The yield of this dried product 4 is about 35% of the precipitate 2 and 7 to 10 mg. are obtained from 100 cc. of saliva. This dried product 4 is saliva-parotin-A. Saliva-parotin-A (product 4) obtained by said method is adapted for the therapy of chronic marginal periodontitis in the form of parenteral injection, tablets, ointments or intraperiodontal dressings.

An example of the present invention is next shown with reference to FIGURE 2 of the accompanying drawings:

*Example*

About 18 liters of acetone was introduced into 4.5 liters of saliva while stirring to make the concentration 80% acetone. The mixture was left to stand over-night. The clean supernatant was removed by means of a siphon. The precipitate was collected by centrifugation, was washed several times with 100 cc. of acetone and ether and was dried in a vacuum in an exsiccator over phosphorous pentoxide. The yield of the 80% acetone precipitate was about 10 g.

10 g. of this dried powder was added to 150 cc. of glacial acetic acid and was stirred and extracted while being kept at 60° C. on a water bath for 2 hours. After being left to cool to room temperature, the extract was filtered through a glass filter. The residue was extracted twice with 150 cc. of glacial acetic acid in the same manner as described above. The residue was washed with 50 cc. of glacial acetic acid. When the three filtrates were combined, 500 cc. of the extract were obtained. When 1 cc. of a saturated aqueous table salt solution was added to this extract, this solution becomes turbid. When 500 cc. of ether was added to the solution in several portions, a white precipitate was deposited. After being left in a refrigerator overnight, the precipitate was collected by centrifugation. The precipitate was washed with 30 cc. of acetone twice and with 30 cc. of ether several times to remove the acetic acid. This precipitate was dried under vacuum in an exsiccator over phosphorous pentoxide. The yield was 1.558 g. This ether precipitate was dissolved in 100 cc. of water of about pH of 10.0 and the insolubles were removed by centrifugation. The supernatant was adjusted to pH 7.0 with N-HCl and was dialyzed with 2 liters of distilled water below 5° C. by using a cellophane bag. The outer liquid for the dialysis was replaced every day and the dialysis was carried on for 6 days. A precipitate was then deposited within the dialysis bag. Its pH was 5.6 to 5.8 (methyl red). When the precipitate was filtered with No. 5 C Toyo Roshi filter paper, a transparent brownish yellow solution was obtained. The concentration of protein in this solution was about 1%. The amount of this solution was 111 cc. When 222 cc. of a saturated aqueous ammonium sulfate solution was introduced into the solution while stirring and while the solution was being cooled with ice and the concentration made 28%, the active ingredient was precipitated in the form of brownish yellow granules. (See FIGURE 1.) After being left in a refrigerator overnight, the precipitate was collected by centrifugation. The precipitate at this time was in the form of a brownish yellow resin. When this precipitate was dissolved in 30 cc. of distilled water and was dialyzed for 6 days within 2 liters of distilled water replaced every day and below 5° C. by using a cellophane bag, a slight amount of a precipitate was deposited. The precipitate was filtered with No. 5 C Toyo Roshi filter paper. The transparent filtrate thus obtained was lyophilized. The yield was 341.5 mg.

To 300 mg. of the lyophilized powder obtained by said method, 50 grams of polyvinylpyrrolidone and 5 grams of sodium chloride were added. The mixture of said materials was dissolved in 1000 cc. of distilled water for injection and filtered. The filtrate was filled in 1 cc. ampules. The ampule filled solutions were sterilized by means of fractional sterilization at low temperature (3 times each for 40 minutes, at 60–65° C.). This sterilized preparation was used for parenteral injection to treat chronic marginal periodontitis. The dosage of the injection for the patient of chronic marginal periodontitis was 2–3 ampules per week.

Polyethylenglycol 4000, 274.4 grams; polyethylenglycol 400, 705.6 grams; methanol, 1.6 grams; ethyl-p-oxybenzoate, 0.25 gram, and butyl-p-oxybenzoate, 0.15 gram were mixed and dissolved on the water bath kept at 60° C. To said solvent, one gram of saliva-parotin-A, dissolved in an adequate volume of distilled water for injection purposes, was added while stirring at 50° C. To the mixture of the solvent and saliva-parotin-A, 5 grams of tannic acid which was dissolved in a adequate volume of distilled water for injection purposes was added. The mixture of these three solutions was sterilized by means of a fractional sterilization at low temperature. The sterilized solution was filled in 2 cc. sterilized package at around 40° C. The sterilized preparation was used as an intraperiodontal dressing for the treatment of chronic marginal periodontitis. The dosage of this preparation for this disease was 0.1 cc. per one tooth and 2–3 times per week.

Thirty grams of saliva-parotin-A and 500 grams of vitamin C were mixed with an adequate volume of lactose and wheat starch to make granules. The tablet weighing 200 mg. was prepared with said granules and other materials namely; talc, magnesium stearate and potato starch. Thereby, 5000 tablets were obtained. The obtained white tablets were coated with sugar and then, coated with enteric coating material. The enteric coated tablets were used to treat patients having chronic marginal periodontitis. The dosage used for the treatment was 2–3 tablets per day.

1.5 grams of saliva-parotin-A were mixed with polyethyleneglycol, 10% saccharin solution, menthol and protease to make 500 grams of an ointment. The ointment was used to treat patients having chronic marginal periodontitis. The dosage used for the treatment was 2–3 applications a day.

Typical examples of formulation for treatment of chronic marginal periodontitis are as follows.

A preparation as an injection:
```
Saliva-parotin-A ------------------- mg-- 0.3–0.6
Polyvinylpyrrolidone --------------- mg-- 50
Sodium chloride -------------------- mg-- 5
Benzyl alcohol --------------------- cc-- 0.005
Distilled water -------------------- cc-- 1.00
```

A preparation as an intraperiodontal dressing:
```
Saliva-parotin-A ------------------- mg-- 1.0–2.0
Polyethylenglycol 4000 ------------- mg-- 250–280
Polyethylenglycol 400 -------------- mg-- 700–730
Tannic acid ------------------------ mg-- 5.0
Menthol ---------------------------- mg-- 1.6
Ethyl-p-oxybenzoate ---------------- mg-- 0.25
Butyl-p-oxybenzoate ---------------- mg-- 0.15
Distilled water to make up to 1.00 cc.
```

A preparation as a tablet:
```
Saliva-parotin-A ------------------- mg-- 6
Vitamin C -------------------------- mg-- 100
Lactose ---------------------------- mg-- 68
Wheat starch ----------------------- mg-- 20
Talc ------------------------------- mg-- 2
Magnesium stearate ----------------- mg-- 1
Potato starch ---------------------- mg-- 3
```

A preparation as an ointment:
```
Saliva-parotin-A ------------------- g-- 0.015–0.03
Saccharin (10% solution) ----------- cc-- 0.025
Menthol ---------------------------- g-- 0.005
Protease --------------------------- g-- 0.005
Polyethyleneglycol to make up to 5.00 grams.
```

What we claim is:

1. A method of producing from saliva a substance having physiological activity comprising adding acetone to saliva to effect an acetone concentration of at least 70%, obtaining precipitate from the saliva and acetone mixture and drying the precipitate, extracting saliva-parotin-A from the precipitate with a solution containing glacial acetic acid, adding salt solution and ether to the extract and precipitating the resultant mixture, dissolving the precipitate in alkaline water, dialyzing the resulting solution until the solution has a pH of 5.6 to 5.8, adding saturated ammonium sulfate to the solution to obtain a precipitate, dissolving the latter precipitate and dialyzing the resulting solution.

2. A method as claimed in claim 1 comprising effecting an acetone concentration of from 70 to 80%.

3. A method as claimed in claim 1 wherein the saliva-parotin-A is extracted by a solution having about fifteen times as much glacial acetic acid as precipitate by weight.

4. A method according to claim 1 wherein the extraction by the glacial acetic acid containing solution is carried out at 60 to 70° C.

5. A method according to claim 1 wherein the extracting solution is a mixture of glacial acetic acid and methanol.

6. A method of producing from saliva a substance having physiological activity comprising precipitating a solution of saliva, extracting saliva-parotin-A from the resulting precipitate by the use of glacial acetic acid, dissolving the extract in a saline solution, precipitating the resulting solution, dissolving the resulting precipitate in alkaline water and dialyzing the resulting solution to obtain a pH of 5.6–5.8, adding ammonium sulphate to obtain a further precipitate, dissolving the precipitate and dialyzing the resulting solution to obtain said substance.

7. The product obtained by the method of claim 6.

8. A preparation having usefulness as an injection for the treatment of chronic marginal periodontitis comprising:
```
Saliva-parotin-A ------------------- mg-- 0.3–0.6
Polyvinylpyrrolidone --------------- mg-- 50
Sodium chloride -------------------- mg-- 5
Benzyl alcohol --------------------- cc-- 0.005
Distilled water -------------------- cc-- 1.00
```
said saliva-parotin-A being obtained by precipitating a solution of salvia, extracting saliva-parotin-A from the resulting precipitate by the use of glacial acetic acid, dissolving the extract in a saline solution, precipitating the resulting solution, dissolving the resulting precipitate in alkaline water and dialyzing the resulting solution to obtain a pH of 5.6–5.8, adding ammonium sulphate to obtain a further precipitate, dissolving the precipitate and dialyzing the resulting solution to obtain said substance.

9. A preparation having usefulness as a intraperiodontal dressing for the treatment of chronic marginal periodontitis comprising:

| | Mg |
|---|---|
| Saliva-parotin-A | 1.0–2.0 |
| Polyethyleneglycol 4000 | 250–280 |
| Polyethyleneglycol 400 | 700–730 |
| Tannic acid | 5.0 |
| Menthol | 1.6 |
| Ethyl-p-oxybenzoate | 0.25 |
| Butyl-p-oxybenzoate | 0.15 |

Distilled water to make up to 1.0 cc.

said saliva-parotin-A being obtained by precipitating a solution of salvia, extracting saliva-parotin-A from the resulting precipitate by the use of glacial acetic acid, dissolving the extract in a saline solution, precipitating the resulting solution, dissolving the resulting precipitate in alkaline water and dialyzing the resulting solution to obtain a pH of 5.6–5.8, adding ammonium sulphate to obtain a further precipitate, dissolving the precipitate and dialyzing the resulting solution to obtain said substance.

10. A preparation having usefulness as a tablet for the treatment of chronic marginal periodontitis comprising:

| | Mg |
|---|---|
| Saliva-parotin-A | 6 |
| Vitamin C | 100 |
| Lactose | 68 |
| Wheat starch | 20 |
| Talc | 2 |
| Magnesium stearate | 1 |
| Potato starch | 3 | said saliva-parotin-A being obtained by precipitating a solution of saliva, extracting saliva-parotin-A from the resulting precipitate by the use of glacial acetic acid, dissolving the extract in a saline solution, precipitating the resulting solution, dissolving the resulting precipitate in alkaline water and dialyzing the resulting solution to obtain a pH of 5.6–5.8, adding ammonium sulphate to obtain a further precipitate, dissolving the precipitate and dialyzing the resulting solution to obtain said substance.

References Cited in the file of this patent

UNITED STATES PATENTS

| 1,133,250 | Ruthrauff | Mar. 23, 1915 |
| 1,386,627 | Keator | Aug. 9, 1921 |
| 1,645,792 | Brownlee | Oct. 18, 1927 |
| 1,916,403 | Atkinson | July 4, 1933 |

OTHER REFERENCES

Ito et al.: Endocrinologia Jap. (Tokyo), 8: 129–40, June 1961 (through Cumulated Index Medicus, 1961, Subj. Index, vol. 2, part III, p. S–1856, col. 1).

Ito et al.: Endocrin. Jap. (Tokyo), 5 (4), pp. 277–9, December 1958 (through Current List of Med. Lit. Subj. Index, vol. 35, June 1959, p. S–435, col. 1, entry No. 49240).

Ito et al.: Endocrin. Jap. (Tokyo), 7: 146–152, June 1960 (through C.I.M., 1960 Subj. Index, vol. 1, part III, p. S–1609, col. 3).

Ito et al.: Endocrin. Jap. (Tokyo), 6: 166–170 and 171–182, September 1959 (through Cumulated Index Medicus, 1960, Author Index, vol. 1, part 1, 1960, p. A–602).

Ito: "Parotin, a Salivary Gland Hormone," Annals N.Y. Acad. Sciences, 85: 228–312, Mar. 29, 1960.

Remington's Practice of Pharmacy, 11th ed., 1956, pp. 302–5, 647–8, 1047–9, 1222.

Quintarelli et al.: Oral Surg. 13: 875–7, July 1960 (through C.I.M., 1960, Subj. Index, vol. 1, part III, p. S–1609, col. 3).

Dechaume: La Presse Medicale 66 (26), pp. 584–6, Apr. 2, 1958.

Chemical and Engineering News, 36 (19), pp. 40–1, May 12, 1958.